United States Patent [19]
Tomatsu et al.

[11] Patent Number: 5,732,570
[45] Date of Patent: Mar. 31, 1998

[54] THERMAL EXPANSION VALVE AND AIR CONDITIONING APPARATUS USING THE SAME

[75] Inventors: Yoshitaka Tomatsu, Chiryu; Yasutaka Kuroda, Anjo; Nobuharu Kakehashi, Toyoake; Hiroshi Kishita, Anjo; Yasushi Yamanaka, Nakashima-gun; Kenichi Fujiwara, Kariya, all of Japan

[73] Assignee: Denso Corporation, Kariya, Japan

[21] Appl. No.: 755,212

[22] Filed: Nov. 22, 1996

[30] Foreign Application Priority Data

| Nov. 24, 1995 | [JP] | Japan | 7-306120 |
| Dec. 18, 1995 | [JP] | Japan | 7-329165 |
| Oct. 23, 1996 | [JP] | Japan | 8-280981 |

[51] Int. Cl.⁶ ............................................. F25B 41/06
[52] U.S. Cl. .................................... 62/527; 62/222
[58] Field of Search ........................... 62/216, 222, 224, 62/225, 528, 504, 527

[56] References Cited

U.S. PATENT DOCUMENTS

| 3,537,645 | 11/1970 | Treder | 62/224 |
| 3,592,018 | 7/1971 | Widdowson | 62/222 |
| 3,738,119 | 6/1973 | Scherer et al. | 62/217 |
| 3,785,554 | 1/1974 | Proctor | 236/34 |
| 3,800,551 | 4/1974 | Weibel et al. | 62/217 |

FOREIGN PATENT DOCUMENTS

A-5-278455  10/1993  Japan.

*Primary Examiner*—William Doerrler
*Attorney, Agent, or Firm*—Harness, Dickey & Pierce, PLC

[57] ABSTRACT

A thermal expansion valve for automotive coolant systems which is significantly more compact than previously developed expansion values. The housing of the expansion valve is divided into a first housing formed in a cylindrical shape with a bottom and a second housing formed in a columnar shape. The first housing is fit into the second housing, and both are integrally connected to each other. A temperature sensing mechanism having a temperature sensing chamber and an expansion mechanism for adjusting an opening degree of a throttle passage in accordance with an evaporator outlet temperature sensed by the temperature sensing means are disposed in the second housing. First and fourth joint portions connected to inlet and outlet refrigerant pipes of the evaporator, respectively, are at the bottom of the first housing. On the other hand, second and third joint portions connected to a compressor suction side refrigerant pipe and a high-pressure side refrigerant pipe from a receiver, respectively, are at an outer surface of the second housing. In this manner the overall size of the expansion valve is reduced considerably, thus saving valuable space in an engine compartment of a vehicle.

19 Claims, 12 Drawing Sheets

THERMAL EXPANSION VALVE AND AIR CONDITIONING APPARATUS USING THE SAME

CROSS REFERENCE TO THE RELATED APPLICATIONS

This application is based on and claims priority of Japanese Patent Application Nos. Hei. 7-306120 filed on Nov. 24, 1995, Hei. 7-329165 filed on Dec. 18, 1995, Hei. 8-280981 filed on Oct. 23, 1996, the contents of which are incorporated herein by reference.

BACKGROUND OF THE INVENTION

1. Field of the Invention

The present invention relates to a thermal expansion valve and an air conditioning apparatus for a vehicle using the same.

2. Description of Related Art

Conventionally, there has been proposed a structure of an expansion valve to improve a mounting performance on a vehicle, of a cooling unit and an expansion valve in an air conditioning apparatus for a vehicle, as disclosed in JP-A-5-278455.

According to such an expansion valve, as shown in FIGS. 12–14, a round through hole 74 is opened in a dashboard D for partitioning an engine compartment E and a passenger compartment R of a vehicle. A connecting member 100 of a refrigerant pipe is fit into the through hole 74. A housing 300 of an expansion valve 3 is provided in a resin-made round block 101 of the connecting member 100. A temperature sensing mechanism 35 and an expanding mechanism 47 are incorporated in the housing 300.

In FIGS. 13 and 14, there are disposed a group 1 of condensing equipment such as a compressor, a condenser, a receiver, and the like, which are installed in the engine compartment E, a cooling unit 2 in the passenger compartment R, and an evaporator 21.

According to such a structure, since the connecting member 100 of the refrigerant pipes and the expansion valve 3 are integrally formed, the cooling unit 2 and the expansion valve 3 are mounted on the vehicle more easily than a structure of a normal type in which the expansion valve 3 is independently installed adjacent the evaporator 21 of the cooling unit 2 in the passenger compartment R. Thus, the mounting performance on a vehicle, of the cooling unit 2 and the expansion valve 3, is improved.

According to the conventional structure, however, as shown in FIG. 13, the temperature sensing mechanism 35 and the expansion mechanism 47 of the expansion valve 3 are accommodated in the housing 300 from an upper opening 301 of the vertically extended housing 300. The upper opening 301 is closed by a cover 302. A sealing portion using an O-ring 303 is provided around the cover 302.

The expansion mechanism 47, the temperature sensing mechanism 35, and the cover 302 having the sealing portion using the O-ring 303 are stacked up in the height direction of the expansion valve 3 (vertical direction of FIG. 13). There is accordingly a problem in that the height of the expansion valve would be large naturally. Consequently, the conventional structure has a problem in that the expansion valve is large-sized. It is a major problem especially for an automobile having a limited installation space.

SUMMARY OF THE INVENTION

In view of the foregoing problems, it is an object of the invention to downsize an outer shape of a thermal expansion valve which also serves as a connecting member of refrigerant pipes.

According to a first aspect the invention, a housing of a thermal expansion valve is halved into first and second housing members, the housing members are engaged with and connected to each other, and a temperature sensing mechanism and an expansion mechanism are assembled in the second housing member. Thus, it is not necessary to attach a cover having a sealing mechanism to the top of the housing as in the conventional structure. The height of the thermal expansion valve is remarkably reduced as compared with the conventional structure. As a result, there is an effect that the thermal expansion valve is remarkably downsized.

Although the housing of the thermal expansion valve is halved, since a first joint portion coupled to an outlet side of an evaporator and a fourth joint portion coupled to an inlet side of the evaporator are provided at one end of the first housing member, both of the first and fourth joint portions can be easily and accurately formed. Similarly, a second joint portion coupled to a suction side of a compressor and a third joint coupled to a high-pressure side are provided on the surface of the second housing member, so that both of the second and third joint portions can be also easily and accurately formed.

The first and fourth joint portions can be airtightly connected to the refrigerant pipes on the inlet/outlet sides of the evaporator and the second and third joint portions can be airtightly connected to the refrigerant pipes on the compressor suction side and the high-pressure side without causing positional deviation. Therefore, leakage of refrigerant from the joint portions can be certainly prevented without especially enhancing the dimensional accuracy of the halved housing members.

In addition, according to another aspect of the invention, the first housing member is formed in a cylindrical shape and the second housing member is formed in a columnar shape. Consequently, the housing of the expansion valve has a columnar shape, and a round block as in a conventional structure is not necessary.

According to another aspect of the invention, a member for airtightly sealing is attached to an engagement portion of the inner surface of the cylindrical first housing member and the peripheral surface of the columnar second housing member. When the halved housing members are used, the sealing member can be disposed each of the peripheral faces of the first to fourth joint portions, so that the first and fourth joint portions and the second and third joint portions can be adjacently disposed. Thus, the connecting portions of the first to fourth joint portions and the refrigerant pipes can be downsized.

According to another aspect of the invention, since the first housing member is directly connected to the evaporator, the expansion valve and the evaporator can be integrated. Consequently, the installation space and the cost are reduced.

There is also provided an air conditioning apparatus for a vehicle, including a group of condensing equipment mounted on an engine compartment and a cooling unit mounted on a passenger compartment. In the apparatus, a through hole is opened in a dashboard partitioning the engine compartment and passenger compartment, and one of the above-mentioned thermal expansion valves is fit into the through hole with an elastic member. The size of the through hole opened in the dashboard can be reduced according to the size of the thermal expansion valve and accordingly it becomes easy to seal the through hole.

In the vehicle where a space is very limited, the mounting performance of the air conditioning apparatus on the vehicle is remarkably improved by downsizing the thermal expansion valve and the smaller through hole in the dashboard.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Embodiments of the present invention will be described with reference to the drawings.

A first embodiment of the present invention will be described.

Figure 2:
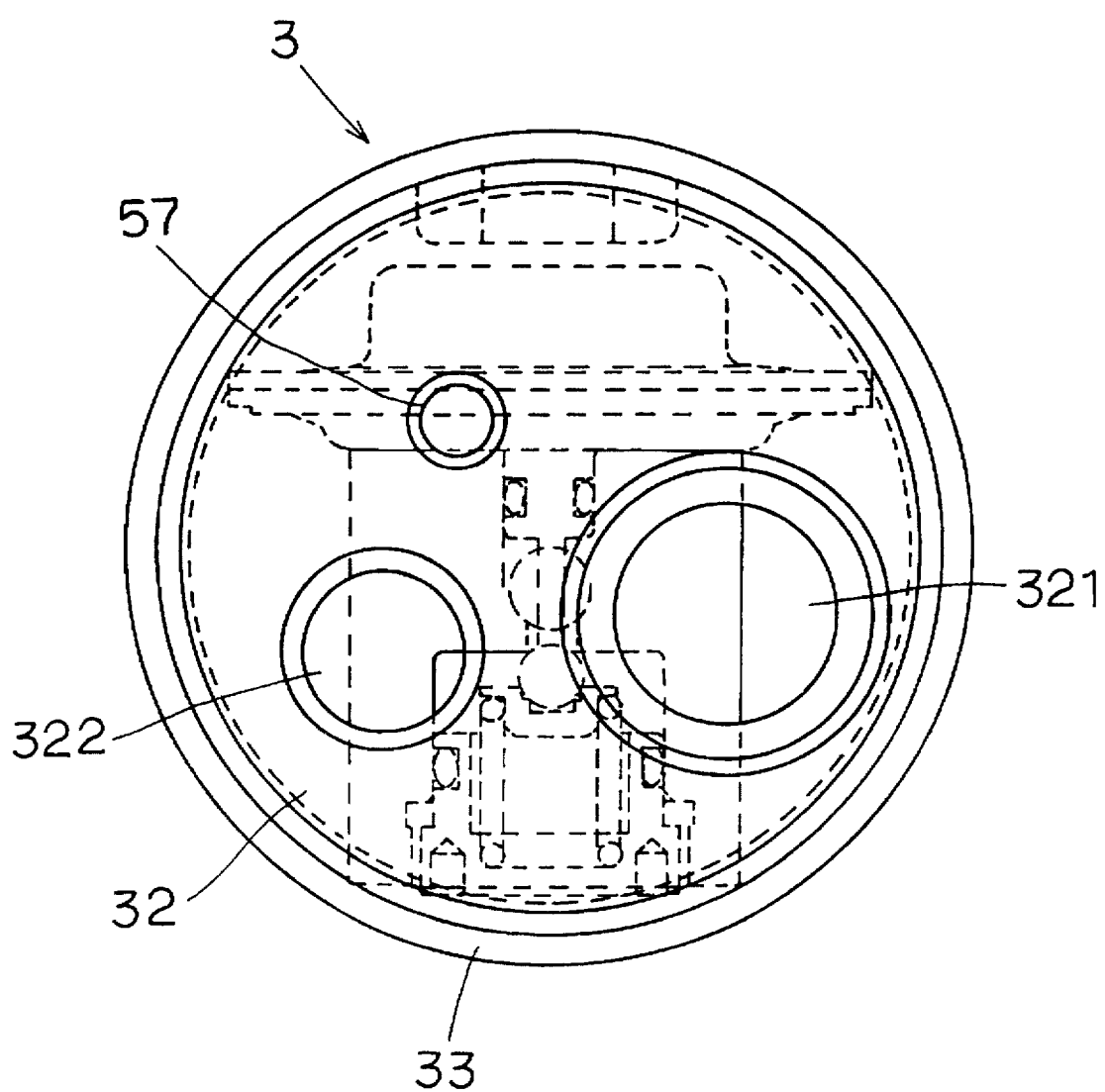
FIG. 2 is a front view of the expansion valve in the first embodiment.
Figure 3:
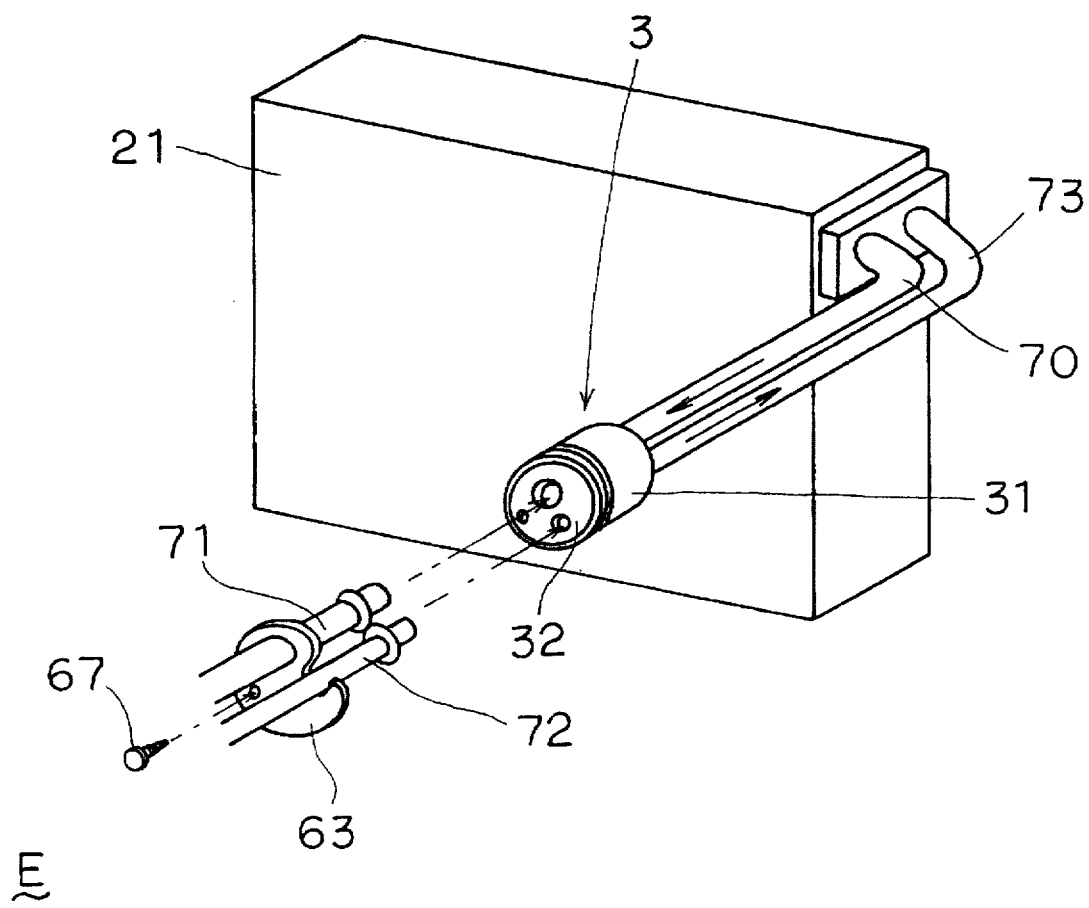
FIG. 3 is an exploded perspective view showing a connection structure of the expansion valve and the refrigerant pipes in the first embodiment.
Figure 4:
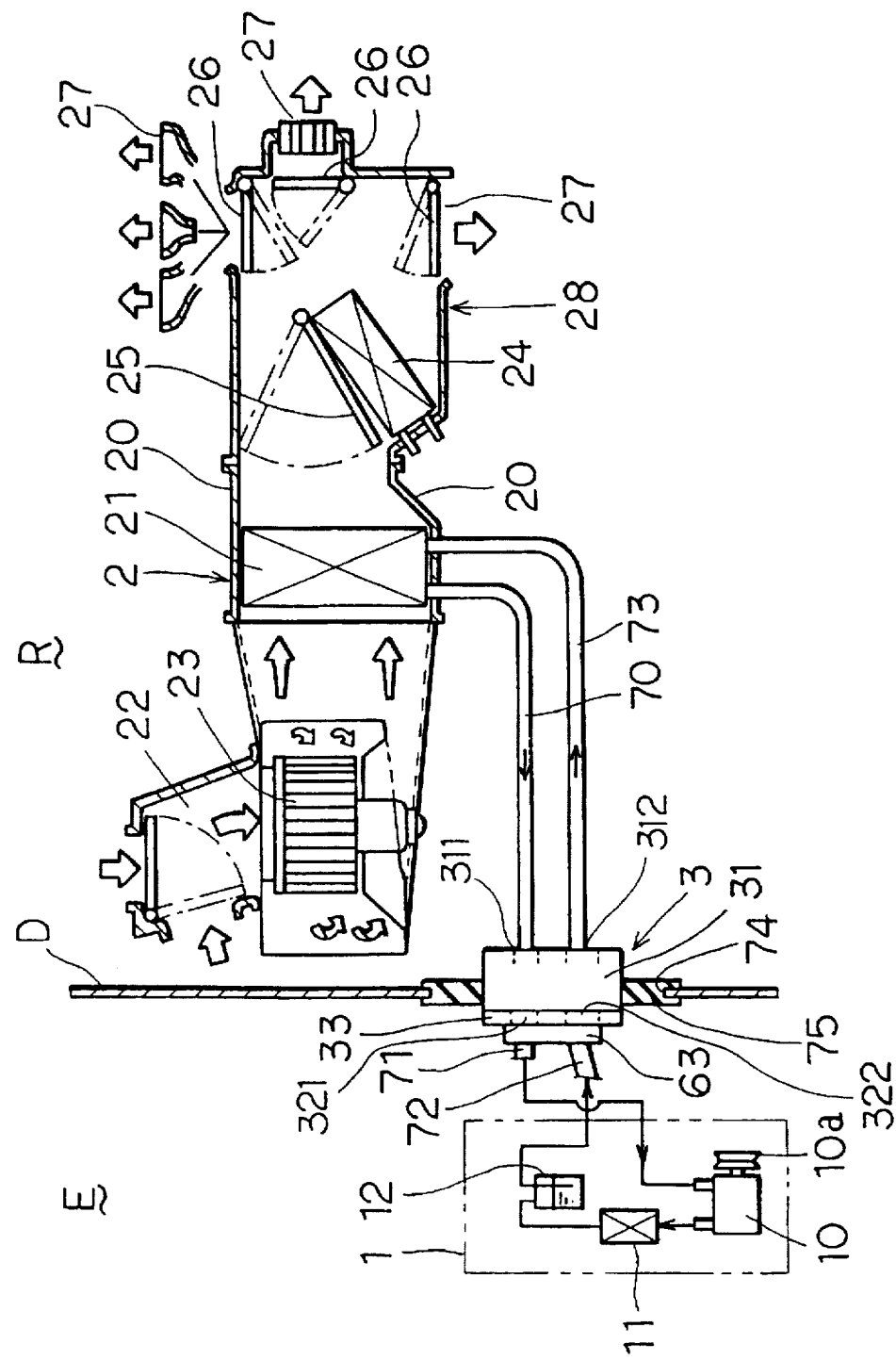
FIG. 4 is a schematic view showing an entire construction of an air conditioning apparatus for a vehicle, employing the expansion valve in the first embodiment.

FIGS. 1 to 4 show the first embodiment. FIG. 4 schematically shows an entire structure of an air conditioning apparatus for a vehicle. In this embodiment, cooling equipment in the air conditioning apparatus includes a condensing equipment group 1 mounted on an engine compartment E of the vehicle, a cooling unit 2 mounted on a passenger compartment R of the vehicle, and a thermal expansion valve 3 arranged in a dashboard D for partitioning the engine compartment E and the passenger compartment R and also serving as a connecting member of refrigerant pipes between the engine compartment E side and the passenger compartment R side.

The condensing equipment group 1 includes a compressor 10 which is driven by an automobile engine, a condenser 11 for cooling and condensing a refrigerant gas discharged from the compressor 10, a receiver 12 for storing the condensed refrigerant from the condenser 11, separating a vapor from the refrigerant, and introducing only a liquid refrigerant to the downstream side; and the like. The compressor 10 is intermittently operated by an electromagnetic clutch 10a.

The cooling unit 2 includes a cooling unit case 20 made of a resin. An evaporator 21 is incorporated in the case 20. The cooling unit 2 cools and dehumidifies air which has been sucked from an inside/outside air switching box 22 of the air conditioning apparatus for the vehicle and blown by a centrifugal multiblade blower 23.

A heater unit 28 is disposed on the downstream air side of the cooling unit 2. The heater unit 28 includes a heater core 24 using hot water, an air mix damper 25 for temperature control, a damper 26 for switching air outlets, various air outlets 27, and the like.

FIG. 3 schematically shows a pipe connecting structure between the evaporator 21 and the expansion valve 3. There are provided pipes 70–73 and a pipe coupling member 63. The suction side refrigerant pipe 71 of the compressor 10 and the high pressure side liquid refrigerant pipe 72 from the receiver 12 are screwed and fixed to a second housing 32 of the expansion valve 3 by means of the pipe coupling member 63 and a bolt 67. The low-pressure refrigerant pipes 70 and 73 extending from the outlet and inlet sides of the evaporator 21 are connected to a first housing 31 of the expansion valve 3 by brazing or the like.

Figure 1:
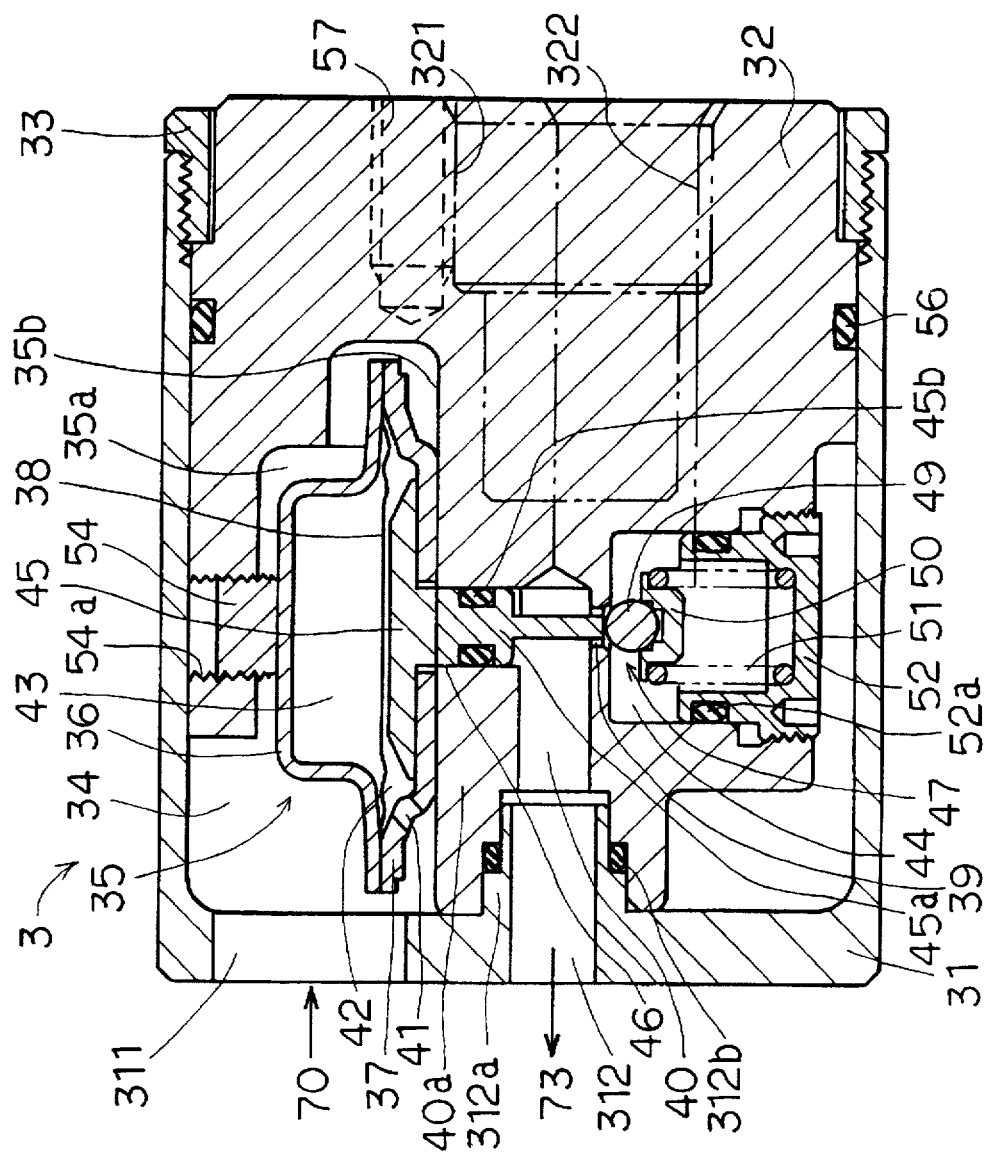
FIG. 1 is a cross sectional view showing an expansion valve according to a first embodiment of the present invention.

The main feature of the invention is the thermal expansion valve 3. A specific structure of the expansion valve 3 will now be described with reference to FIGS. 1 and 2. The first and second housings 31 and 32 are made of a light weight and corrosion-resistant metal such as aluminum. The first housing 31 has a cylindrical shape having a bottom at one end and an opening at the other end as shown in FIG. 1. On the bottom of the first housing 31, there are formed a first joint portion (refrigerant inlet portion) 311 which is connected to the low-pressure refrigerant pipe 70 from the outlet side of the evaporator 21 and a fourth joint portion (refrigerant outlet portion) 312 which is connected to the low-pressure refrigerant pipe 73 from the inlet side of the evaporator 21.

The fourth joint portion (refrigerant outlet portion) 312 is disposed almost in the center of the bottom of the first housing 31. The first joint portion (refrigerant inlet portion) 311 is disposed in a portion biased from the center of the bottom of the first housing 31.

On the other hand, as shown in FIG. 1, the second housing 32 has a column shape and can be inserted into the first housing 31. A second joint portion (refrigerant outlet portion) 321 and a third joint portion (refrigerant inlet portion) 322 are formed on the end face (surface portion) of the second housing 32. An end of the refrigerant pipe 71 from the compressor suction side is fit into and connected to the second joint portion 321. An end of the high-pressure side liquid refrigerant pipe 72 from the receiver 12 is fit into and connected to the third joint portion 322.

The first and second housings 31 and 32 are screwed by a cover 33 so as not to come off and are integrally coupled to each other. An O-ring (elastic sealing member) 56 is disposed around the fitting face of the first and second housings 31 and 32 to keep the airtightness from the outside.

In the second housing 32, the temperature sensing mechanism 35 and the expansion mechanism 47 are disposed in a direction which perpendicularly crosses the fitting face of the first and second housings 31 and 32 (i.e., a direction which perpendicularly crosses the axial direction of the housings 31 and 32). In the second housing 32, a chamber 35a for housing the temperature sensing mechanism 35 is connected to a low-pressure side refrigerant passage 34. One end of the low-pressure side refrigerant passage 34 is connected to the first joint portion 311 and the other end is connected to the second joint portion (refrigerant outlet portion) 321.

The temperature sensing mechanism 35 includes an upper metal diaphragm case 36, a lower metal diaphragm case 37, and a metal diaphragm (pressure interlocking member) 38 which is sandwiched and fixed between the cases 36 and 37. The diaphragm cases 36 and 37 and the diaphragm 38 are made of a corrosion-resistant metal such as stainless steel and are integrally joined by welding or the like.

In the lower diaphragm case 37, a low-pressure introducing hole 41 is formed at a portion below the diaphragm 38. Through the low-pressure introducing hole 41, a refrigerant pressure (low pressure) in the low-pressure side refrigerant passage 34 is introduced into a pressure chamber 42 between the diaphragm case 37 and the diaphragm 38.

Activated charcoal (not shown) and the same refrigerant gas as that in a refrigerating cycle are sealed in a temperature sensing chamber 43 formed between the upper diaphragm case 36 and the diaphragm 38. It may be acceptable that the activated charcoal (not shown) is not sealed but only the refrigerant gas is sealed in the temperature sensing chamber 43. Since the same refrigerant as that in the refrigerating cycle is sealed in the temperature sensing chamber 43, the pressure in the temperature sensitive chamber 43 indicates a saturation pressure according to the surrounding temperature of the refrigerant (the temperature of the refrigerant flowing from the low-pressure side refrigerant passage 34 to the chamber 35a).

A screw member 54 is disposed to face the upper metal diaphragm case 36. By screwing the screw member 54 into a screw hole 54a, the upper metal diaphragm case 36 is pushed downward. The lower metal diaphragm case 37 is consequently pressed against a supporting face 35b of the housing chamber 35a of the second housing 32, thereby fixing the temperature sensing mechanism 35 to the second housing 32.

A metal contacting member 45 which is displaced according to displacement of the diaphragm 38 is disposed in the pressure chamber 42 within the lower diaphragm case 37. One end of an axis portion 45a which is separately formed comes into contact with the contacting member 45. The axis portion 45a is held to slide along a guide hole 46 formed in the second housing 32.

An O-ring (elastic sealing member) 45b keeps airtightness between the axis portion 45a and the guide hole 46. A spherical valve element 49 of the expansion mechanism 47 comes into contact with the other end of the axis portion 45a. The opening of a throttle passage 39 is adjusted by the valve element 49. The upstream side of the throttle passage 39 is connected to the third joint portion (refrigerant inlet portion) 322 via a high-pressure chamber 44. The portion 322 is connected to the high-pressure side liquid refrigerant pipe 72. The downstream side of the throttle passage 39 is communicated with the fourth joint portion (refrigerant outlet portion) 312 through a low-pressure chamber 40. The portion 312 is connected to the low-pressure refrigerant pipe 72 on the inlet side of the evaporator 21.

The spherical valve element 49 is joined to a spring seat plate 50 by means of spot welding or the like. The spring force of a coil spring 51 acts on the valve element 49 through the seat plate 50. One end of the coil spring 51 is held by the seat plate 50 and the other end is held by a spring holding cylinder 52.

The spring holding cylinder 52 is fixed to the wall surface of the second housing 32 so that the position can be adjusted by a screw. By adjusting the installation position of the spring holding cylinder 52 by the screw, the spring force acting on the valve element 49 is adjusted and opening valve characteristics of the valve element 49 are adjusted. In this way, the degree of superheating of the refrigerant from the outlet of the evaporator 21 can be adjusted.

By arranging an O-ring (elastic sealing member) 52a between the spring holding cylinder 52 and the wall face of the second housing 32, the high-pressure chamber 44 is airtightly maintained against the low-pressure side.

Further, a cylinder portion 40a is formed around the low-pressure chamber 40 in the second housing 32. A cylinder portion 312a is formed around the fourth joint portion (refrigerant outlet portion) 312 on the bottom of the first housing 32. The cylinder portion 40a of the second housing 32 is engaged with the outer periphery portion of the cylinder portion 312a. The engagement faces of the cylinder portions 40a and 312a form stepped shapes. By arranging an O-ring (elastic sealing member) 312b to the stepped portions, the fourth joint portion 312 and the low-pressure side refrigerant passage 34 are coupled to keep airtightness therebetween.

The end of the cylinder portion 40a of the second housing 32 comes into contact with the bottom of the first housing 31, thereby determining the assembling position in the axial direction of the first and second housings 31 and 32. Therefore, the cylinder portion 40a also serves as a positioning member.

A screw hole 57 is opened on the end face of the second housing 32. By screwing the bolt 67 shown in FIG. 3 into the screw hole 57, the refrigerant pipe 71 on the suction side of the compressor 10 and the high-pressure side liquid refrigerant pipe 72 from the receiver 12 are screwed and fixed to the second housing 32 with the pipe coupling member 63.

By connecting the thermal expansion valve 3 to the refrigerant pipes 70 to 73 as mentioned above, the thermal expansion valve 3 also serves as a connecting member which connects between the refrigerant pipe on the engine compartment R side and the refrigerant pipe on the passenger compartment R side.

The circular through hole 74 is opened in the dashborad D. An elastic grommet 75 made of rubber is attached to the through hole 74. The first housing 31 of the thermal expansion valve 3 is press-fit into the center hole of the grommet 75 and is held.

A method of assembling the thermal expansion valve 3 in this embodiment will be described. First, in a single state of the second housing 32, the expansion mechanism 47 is accommodated and assembled in the high-pressure chamber 44 of the second housing 32. That is, the spherical valve element 49 of the expansion mechanism 47, the spring seat plate 50 which is integral with the valve element 49, the coil spring 51, and the spring holding cylinder 52 are accommodated and the spring holding cylinder 52 is screwed to the wall face of the second housing 32.

Subsequently, the axis portion 45a of the temperature sensing mechanism 35 is assembled in the guide hole 46 through the screw hole 54a into which the screw member 54 has not been attached yet. Then, the contacting member 45 and the diaphragm cases 36 and 37 to which the diaphragm 38 has been attached are accommodated in the housing chamber 35a of the temperature sensing mechanism 35 from the left opening shown in FIG. 1.

The screw member 54 is screwed into the screw hole 54a, thereby pressing the diaphragm cases 36 and 37 against the supporting face 35b of the housing chamber 35a and fixing the diaphragm cases 36 and 37 in the housing chamber 35a.

Consequently, the temperature sensing mechanism 35 and the expansion mechanism 47 are assembled in the second housing 32. By adjusting the screwing position of the spring holding cylinder 52 in such a state, the preset installation load of the coil spring 51 is adjusted, thereby making it possible to adjust the degree of superheating of the refrigerant from the outlet of the evaporator, which is controlled by the thermal expansion valve 3, to a predetermined value.

After attaching the O-ring 53 in the groove on the periphery of the second housing 32, the second housing 32 is fit into the first housing 31. The housings 31 and 32 are screwed by the cover 33 and integrally coupled.

A method of mounting the expansion valve of the invention on the vehicle will be described. Firstly, the first housing 31 is preliminarily integrated to the refrigerant pipes 70 and 73 on the evaporator 21 side by a connecting means such as brazing. Then, as shown in FIG. 4, the rubber grommet 75 is directly press-fit into the through hole 74 of the dashboard D, and the first housing 31 is press-fit into the center hole of the rubber grommet 75 from the passenger compartment R side. The second housing 32 is fit into the first housing 31 by an operation from the engine compartment E side, and both housings 31 and 32 are screwed and integrated with other by the cover 33.

According to such an assembling method, at maintaining the expansion valve, the first housing 31 is fit in the through hole 74 portion of the dashboard D while being connected to the refrigerant pipes 70 and 73 on the evaporator 21 side. On the other hand, the second housing 32 can be taken out from the first housing 31 by the operation from the engine compartment E side. Accordingly, the temperature sensing mechanism 35 in the second housing 32 and the expansion mechanism 47 can be simply checked, repaired or replaced, thereby improving the maintaining performance of the expansion valve 3.

An operation of the embodiment having the above structure will be described.

The gas refrigerant evaporated in the evaporator 21 of the cooling unit 2 flows through the refrigerant pipe 70 into the low-pressure side refrigerant passage 34 from the first joint portion (refrigerant inlet portion) 311 of the first housing 31 and passes through the passage 34. The temperature of the refrigerant passing the passage 34 is sensed by the temperature sensing chamber 43 and the pressure in the temperature sensing chamber 43 is set to a pressure corresponding to the temperature of the refrigerant.

The refrigerant pressure of the low-pressure side refrigerant passage 34 is introduced through the low pressure introducing hole 41 into the pressure chamber 42 below the diaphragm 38. Since the spring force of the spring 51 acts on the diaphragm 38 via the valve element 49, axis portion 45a, contacting member 45, and the like, the diaphragm 38 is displaced according to these forces. The valve element 49 is moved to a position according to the displacement of the diaphragm 38, thereby adjusting the opening degree of the throttle passage 39.

By the adjustment of the opening with the valve element 49, the refrigerant from the outlet of the evaporator is maintained to a predetermined degree of superheating which is determined by the spring force (preset installation load) of the spring 51.

The housing of the thermal expansion valve 3 is halved, the columnar second housing 32 is fit into the cylindrical first housing 31, and the temperature sensing mechanism 35 is assembled in the second housing 32. Therefore, it is not necessary to attach a cover having a sealing mechanism to the top of the housing as in the conventional structure, so that the height (vertical dimension in FIG. 1) of the thermal expansion valve 3 can be reduced.

Since the expansion valve 3 of the embodiment has a columnar shape, a round block in the conventional structure is not necessary. The expansion valve 3 can be directly press-fit into and held in the rubber grommet 75. The through hole 74 opened in the dashboard D can be accordingly made smaller and the sealing at the through hole 74 portion is simplified.

Figure 5:
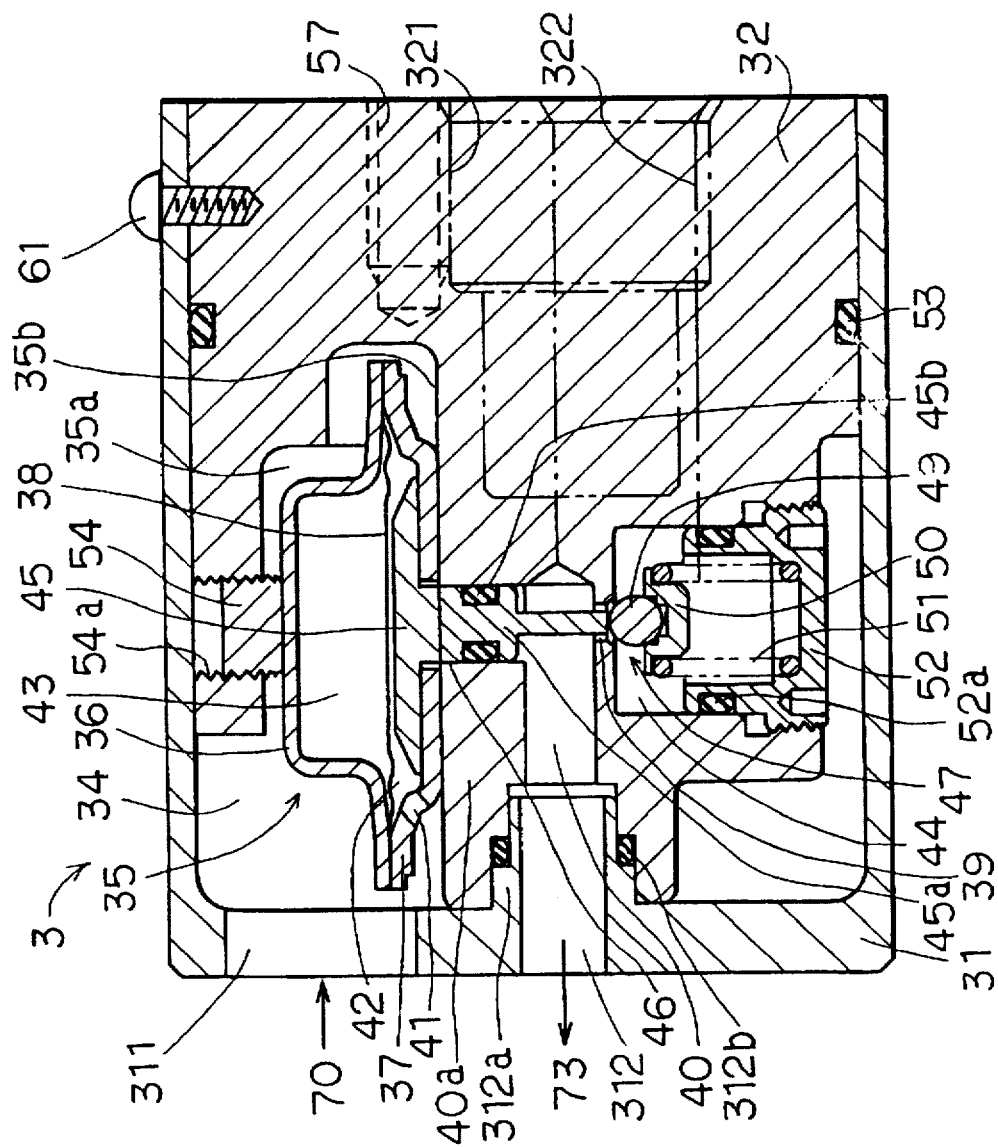
FIG. 5 is a cross sectional view showing an expansion valve according to a second embodiment of the present invention.

A second embodiment of the present invention will be described with reference to FIG. 5.

As a connecting structure of the first and second housings 31 and 32, these housings 31 and 32 are tightly fixed directly by a bolt 61 without using the cover 33 to be screwed as in the first embodiment. The remaining structure is similar to that of the first embodiment.

A third embodiment of the present invention will be described with reference to FIGS. 6 and 7.

Figure 6:
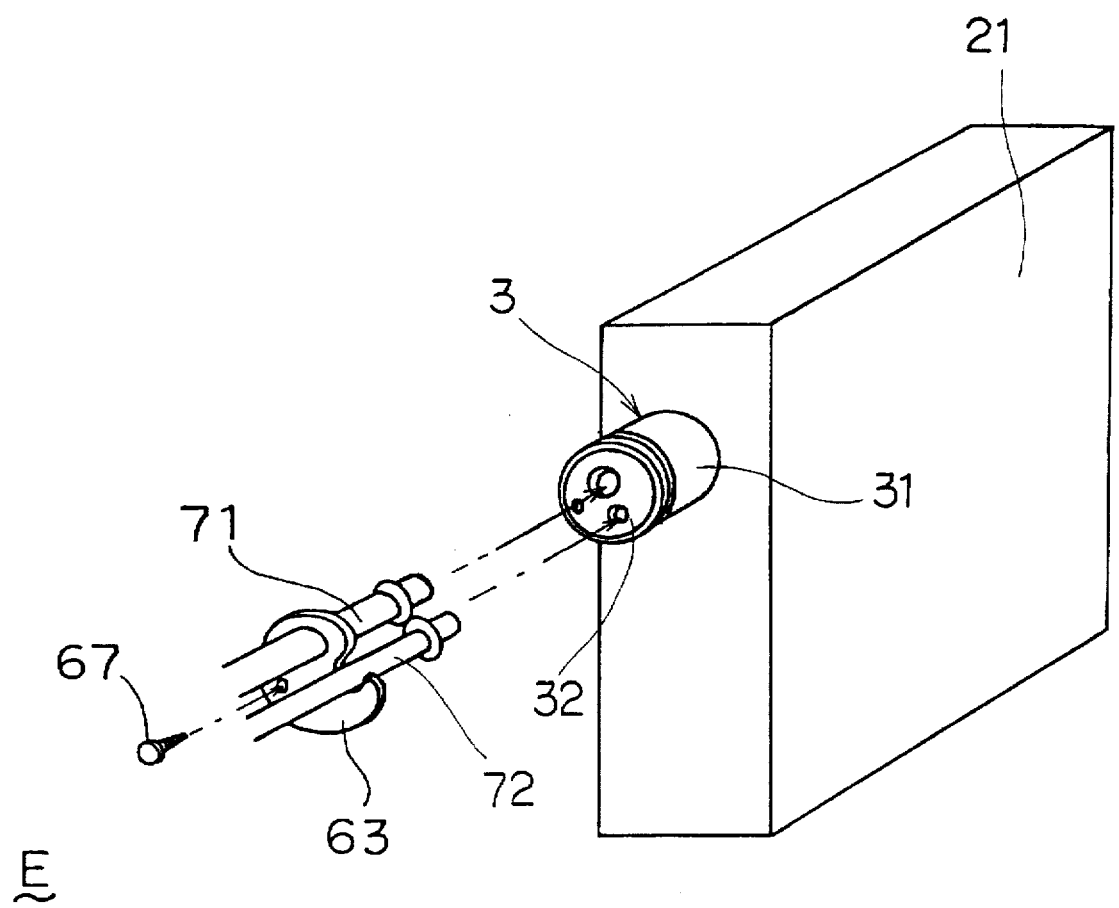
FIG. 6 is an exploded perspective view showing a connection structure of an expansion valve and refrigerant pipes according to a third embodiment.
Figure 7:
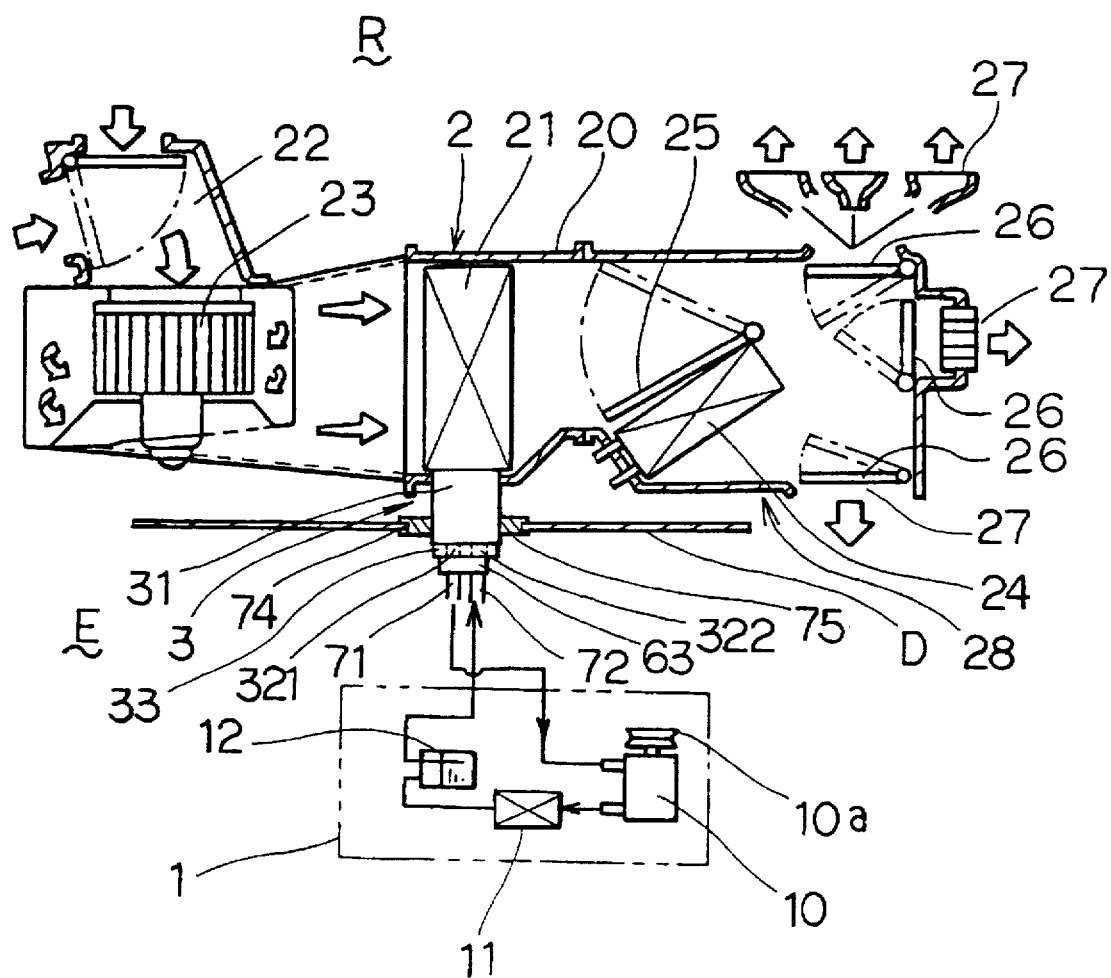
FIG. 7 is a schematic view showing an entire construction of an air conditioning apparatus for a vehicle, employing the expansion valve in the third embodiment.

In FIGS. 6 and 7, the expansion valve 3 is directly connected to the evaporator 21. The first housing 31 of the expansion valve 3 is directly connected to an end plate (not shown) of the evaporator 21 by brazing or the like. The first and fourth joint portions 311 and 312 of the first housing 31 are coupled to the outlet side refrigerant pipe 70 and the inlet side refrigerant pipe 73 of the evaporator 21, which are formed on the end plate of the evaporator 21.

According to the third embodiment, only the first housing 31 of the expansion valve 3 is directly brazed to the end plate (not shown) of the evaporator 21. Then, the second housing 32 having therein the temperature sensing mechanism 35 and the expansion mechanism 47 is coupled to the first housing 31.

In the third embodiment, it may be also acceptable that the first housing 31 is directly connected to the end plate of the evaporator 21 by screwing or the like after the assembly of the entire expansion valve 3 has been completed.

The outer shape of each of the housings 31 and 32 is not limited to the regular cylindrical one as shown in FIG. 2, but may be changed to an oval, rectangle, polygon, or the like.

As sealing means of the engagement face between the housings 31 and 32, a face sealing structure in which a stepped face is press-contacted with the engagement face of the housings 31 and 32 may be also used without using the O-ring 53.

In the first embodiment shown in FIG. 4, when the expansion valve 3 is assembled to the dashboard D, the columnar outer shape of the housings 31 and 32 of the expansion valve 3 is directly fit into the rubber grommet 75. However, it may be acceptable that the housings 31 and 32 have a shape other than the columnar shape, such as a polygonal shape, a round body made of resin is integrally provided on the outer side of the polygonal housings 31 and 32 in the same manner as in JP-A-5-278455, and the round body is fit into the grommet 75 made of rubber.

In the foregoing embodiment, the first and fourth joint portions 311 and 312 are disposed on the bottom formed at one end of the first housing 31 however, the first and fourth joint portions 311 and 312 may be disposed on an outer peripheral surface at one end of the first housing 31.

A fourth embodiment of the present invention will be described with reference to FIGS. 8 and 9.

The description of the same or equivalent elements as those in the foregoing embodiments is omitted here. The feature of this embodiment will be described.

A first housing 131 and a second housing 132 are used in the embodiment in place of the first and second housings 31 and 32 in the foregoing embodiment. The first and second housings 131 and 132 are screwed by the cover 33 so as not to come off in the same manner as in the foregoing embodiment. A temperature sensing mechanism 135 disposed in the housings 131 and 132 has an upper diaphragm case 136, a lower diaphragm case 137 and a metal diaphragm which is sandwiched and fixed between the cases 136 and 137.

Figure 8:
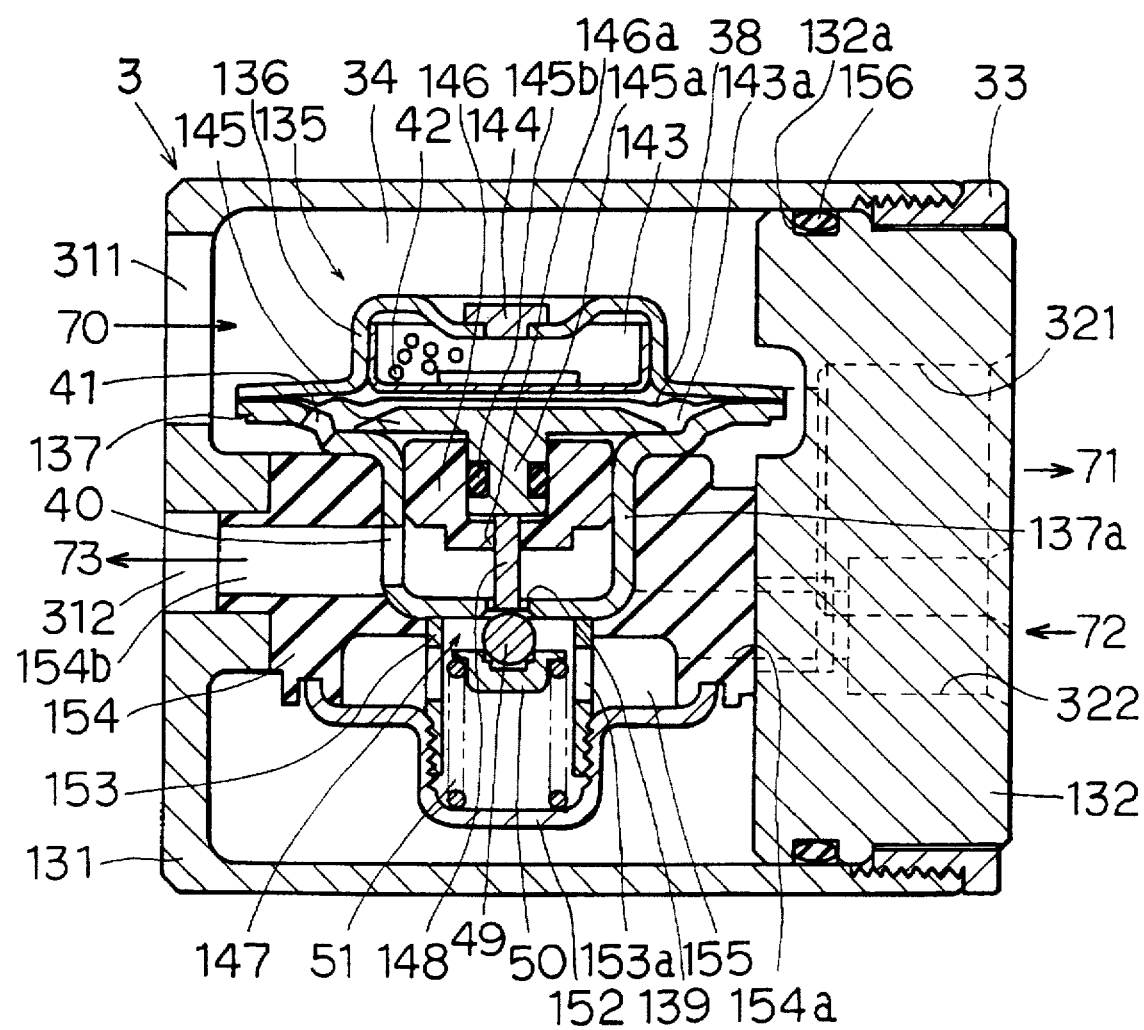
FIG. 8 is a cross sectional view showing an expansion valve according to a fourth embodiment of the present invention.
Figure 9:
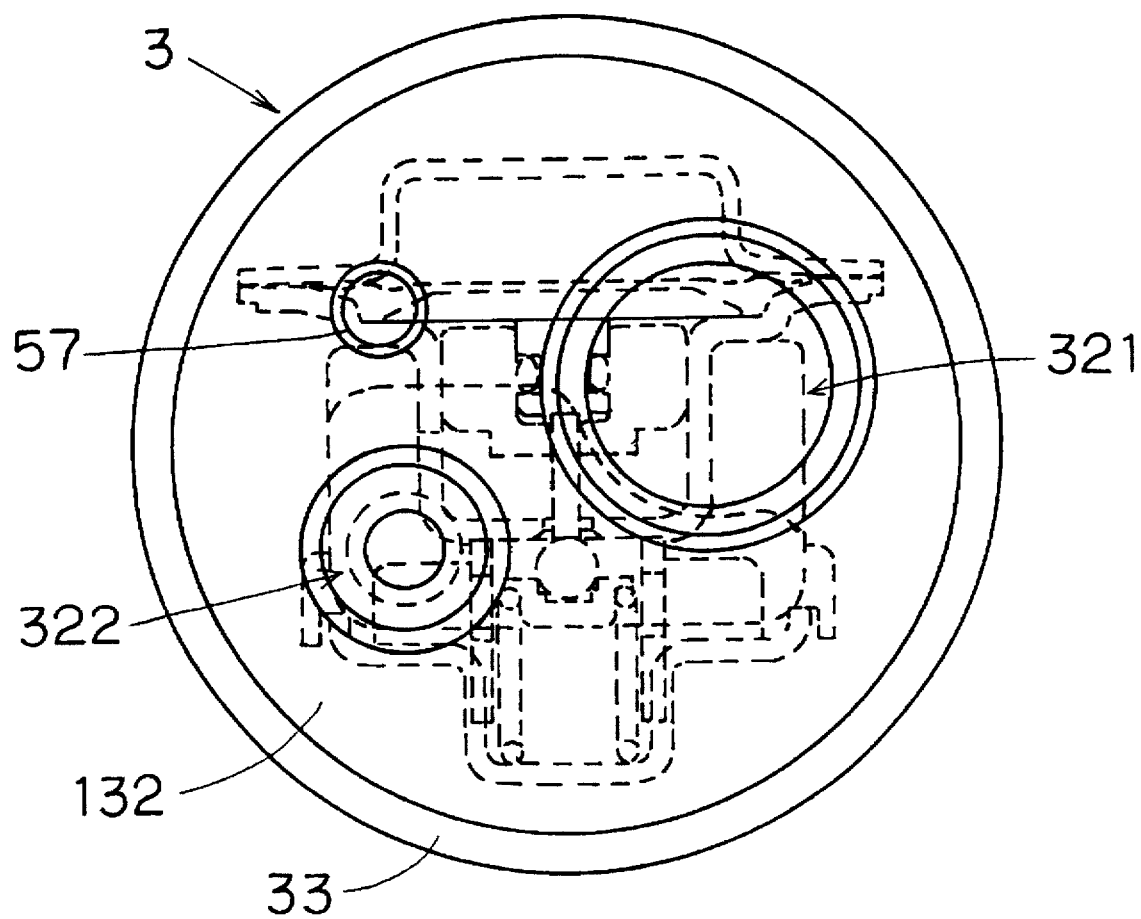
FIG. 9 is a side view of the expansion valve in the fourth embodiment.

The lower diaphragm case 137 has a cup-shaped portion 137a extending in the downward direction of FIG. 8. A throttle passage 139 of the refrigerant is formed on the bottom of the cup-shaped portion 137a. A refrigerant outflow hole 40 is formed on the side face (circumferential face) of the cup-shaped portion 137a. In the lower diaphragm case 137, at a portion located below the diaphragm 38, the low-pressure introducing hole 41 from which the refrigerant pressure (low pressure) in the low pressure side refrigerant passage 34 is introduced is formed in a pressure chamber 143a disposed between the diaphragm case 137 and the diaphragm 38.

The activated charcoal 42 is sealed in a temperature sensing chamber 143 formed between the upper diaphragm case 136 and the diaphragm 38. After the same refrigerant gas as the one in the refrigerating cycle is sealed, the opening of the upper diaphragm case 136 is sealed with a cover 144 by brazing or the like.

A metal contacting member 145 which is displaced according to the displacement of the diaphragm 38 is disposed in the pressure chamber 143a in the lower diaphragm case 137. The contacting member 145 has an axis portion 145a which is held to slide along a resin-made guide 146 which is press fit to the inner wall face of the cup-shaped portion 137a of the lower diaphragm case 137.

An O-ring 145b keeps airtightness between the axis portion 145a of the contacting member 145 and the guide 146. One end of a valve rod 148 of an expansion mechanism 147 comes into contact with the contacting member 145. The valve rod 148 is slidably fit into a through hole 146a opened in the guide 146.

A passage cylinder 153 is integrally attached to the outer wall face of the bottom of the cup-shaped portion 137a of the lower diaphragm case 137. A spring holding cylinder 152 is fixed to the passage cylinder 153 by a screw. By adjusting the installation position of the spring holding cylinder 152 by the screw, the spring force acting on the valve element 49 is adjusted and the opening valve characteristics of the valve element 49 are adjusted. Thus, the degree of superheat of the refrigerant from the outlet of the evaporator 21 can be adjusted.

A passage hole 153a is formed on the side face (circumferential face) of the passage cylinder 153. The passage hole 153a connects a high pressure space 155 formed in the spring holding cylinder 152 with the passage cylinder 153.

A temperature sensing mechanism 135 and the expansion mechanism 147 are integrally joined in a body (supporting member) 154 made of rubber by press-fitting or baking. In more detail, the cup-shaped portion 137a of the lower diaphragm case 137, passage cylinder 153 and spring holding cylinder 152 in the temperature sensing mechanism 135 and the expansion mechanism 147 are integrally joined within the rubber body 154 by press-fitting or baking so that all of the temperature sensing mechanism 135 and expansion mechanism 147 are held by the rubber body 154.

Since the body 154 is used in a refrigerant atmosphere including lubricating oil of the compressor, it may be preferably made of a rubber material which is not easily deteriorated by the lubricating oil and the refrigerant and has swelling-resistant and contraction-resistant characteristics. Specifically, ethylene propylene (EPDM) rubber is preferable.

A high-pressure side refrigerant passage 154a and a low-pressure side refrigerant passage 154b are formed in the body 154. A second refrigerant inflow hole 322 opened in the second housing 132 is connected to the high-pressure space 155 through the high-pressure side refrigerant passage 154a. The high-pressure liquid refrigerant from the high-pressure side refrigerant pipe 72 passes through the second refrigerant hole 322, high-pressure side refrigerant inflow passage 154a, high-pressure space 155 and passage hole 153a and reaches the space in the passage cylinder 153 (i.e., the space around the valve element 49).

A refrigerant outflow hole 40 opened in the cup-shaped portion 137a of the lower diaphragm case 137 is connected to the first refrigerant outflow hole 312 through the low-pressure side refrigerant passage 154b of the body 154.

The body 154 is sandwiched between the first and second housings 131 and 132 while being compressed by a predetermined amount. Consequently, all of the temperature sensing mechanism 135 and the expansion mechanism 147 are elastically supported (rubber-floated) in the housings 131 and 132 by the rubber body 154.

An annular concave groove 132a is formed at a portion of the second housing 132 which is inserted into the first housing 131. An O-ring 156 is fit into the concave groove 132a.

According to the expansion valve having such a structure, when the high-pressure liquid refrigerant from the high-pressure chamber 155 passes through a throttle passage 139 during the operation, the high-pressure refrigerant is rapidly decompressed and expanded. The valve element 49 is influenced by the rapid decompressing and expanding actions of the refrigerant in the throttle passage 139 and repeats fine vibration.

The vibration of the valve element 49 is transmitted to the valve rod 148 connected to the valve element 49, the metal contacting member 145 in contact with the valve rod 148, the metal diaphragm 38 in contact with the contacting member 145, and further to the diaphragm cases 136 and 137 fixedly holding the peripheral portion of the diaphragm 38.

Since the temperature sensing mechanism 135 and the expansion mechanism 147 are elastically supported (rubber floated) in the housings 131 and 132 by the rubber body 154, the vibration is absorbed by the rubber body 154. Consequently, the transmission of the vibration to the housings 131 and 132 is effectively reduced.

Therefore, noises in the room due to propagation of the vibration of the housings 131 and 132 through the refrigerant pipes and the like to the evaporator 21 and the vibration of the refrigerant pipes can be effectively reduced. Since the diaphragm cases 136 and 137 which mainly generates the transmission sound are accommodated in the housings 131 and 132, the noises released to the passenger compartment by the transmission sound can be also effectively reduced. Thus, the thermal expansion valve with low noise can be provided.

By using the first and second housings 131 and 132, an equivalent effect to that of the foregoing embodiment can be obtained.

In the fourth embodiment, in order to stabilize the support of the temperature sensing mechanism 135 and the expansion mechanism 147, a rubber body may be additionally installed in portions, for instance, between the upper diaphragm case 136 of the temperature sensing mechanism 135 and the inner wall face of the first housing 131 and between the spring holding cylinder 152 of the expansion mechanism 147 and the inner wall face of the first housing 131.

Figure 10:
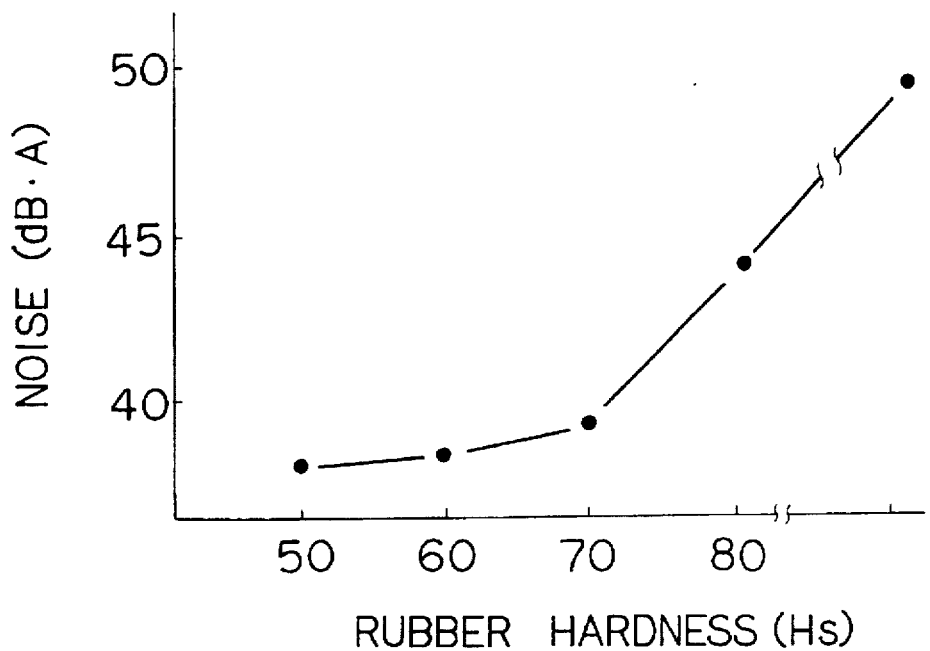
FIG. 10 is a graph showing a relationship between the hardness of the rubber body and the noise in the fourth embodiment.
Figure 12:
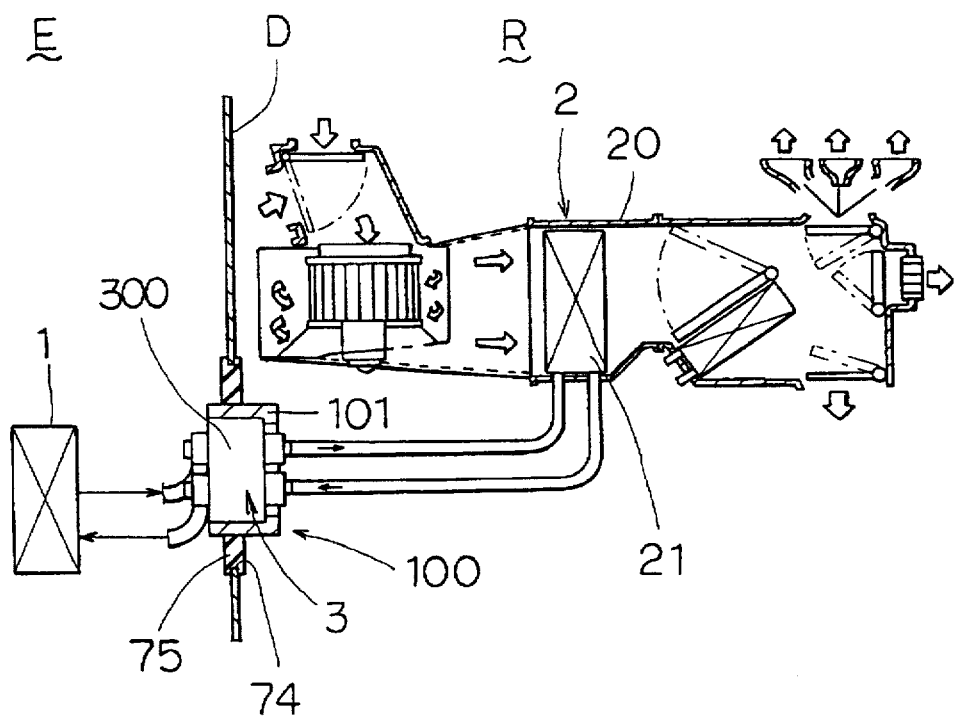
FIG. 12 is a schematic view showing an entire construction of an air conditioning apparatus for a vehicle, employing the conventional expansion valve.

FIG. 10 is a graph of experimental results showing the relationship between hardness of the rubber material used for the rubber body 154 and the noise of the expansion valve. The experiment conditions are those at the time when the refrigerating cycle is started; the cycle high pressure is 12 kg/cm$^2$, the cycle low-pressure is 3 kg/cm$^2$, and subcooling of the liquid refrigerant flowing in the expansion valve 3 is 15° C.

Conditions of noise measurement are that a microphone is installed at a position which is apart from the expansion valve 3 by 120 mm in a soundproof room, a noise level meter is set to the A-weighted sound pressure level, and an average value of noise in an audio frequency range from 20 Hz to 20 kHz is measured.

As understood from the graph, it is effective to enhance the effect of noise reduction that the hardness of the rubber material is set to a level equal to or less than Hs 70.

When the hardness of the rubber material used for the rubber body 154 is greatly reduced, the support of the temperature sensing mechanism 135 and the expansion mechanism 147 becomes unstable. A sealing function of the connecting portions of the refrigerant passages 154a and 154b provided in the rubber body 154 and the refrigerant passage holes 312 and 322 on the housings 131 and 132 sides deteriorates. Consequently, the lower limit of the hardness of the rubber material is preferably set to Hs 50 or larger in order to stabilize the support of the mechanisms 135 and 147 and to secure the sealing performance of the passage connecting portions.

Thus, in practice, it is preferable to set the hardness of the rubber material used for the rubber body 154 within a range from Hs 50 to 70.

FIG. 10 shows comparison data when the rubber body 154 is replaced with an aluminum body.

A fifth embodiment of the present invention will be described with reference to FIG. 11.

Figure 11:
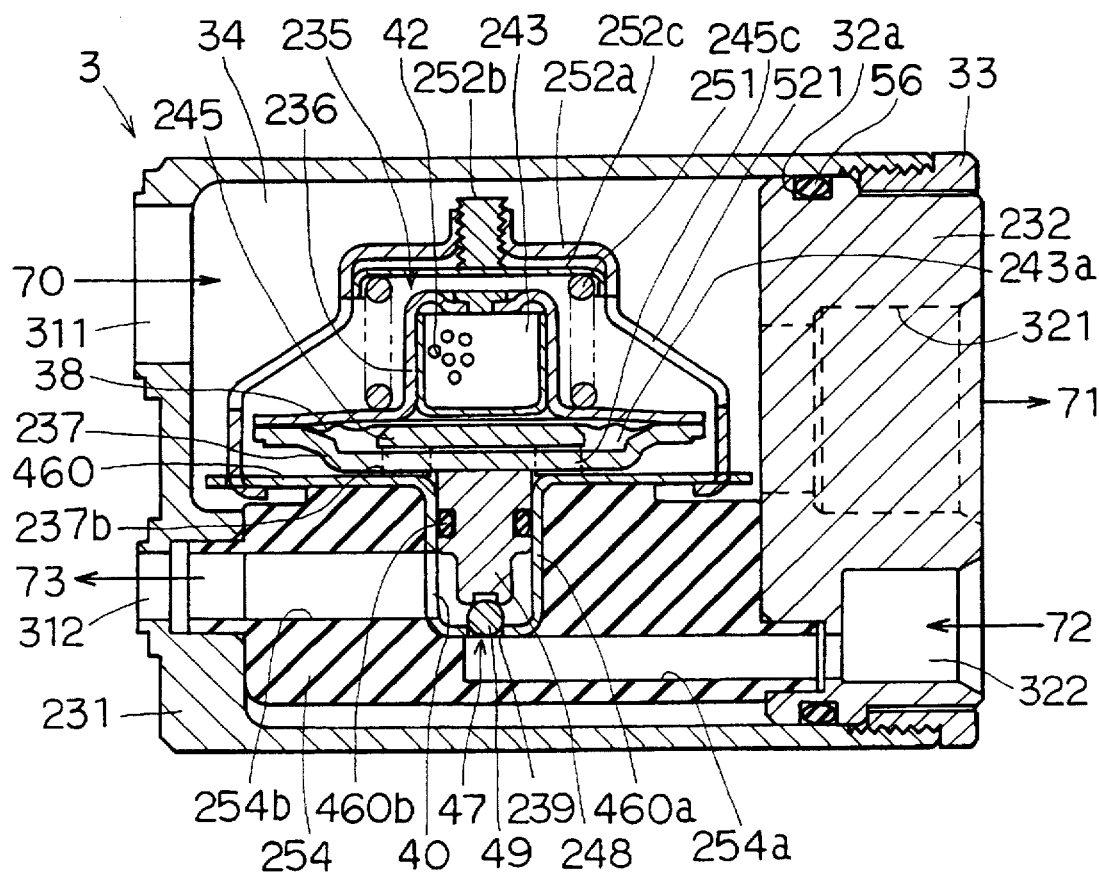
FIG. 11 is a cross sectional view showing an expansion valve according to a fifth embodiment of the present invention.
Figure 13:
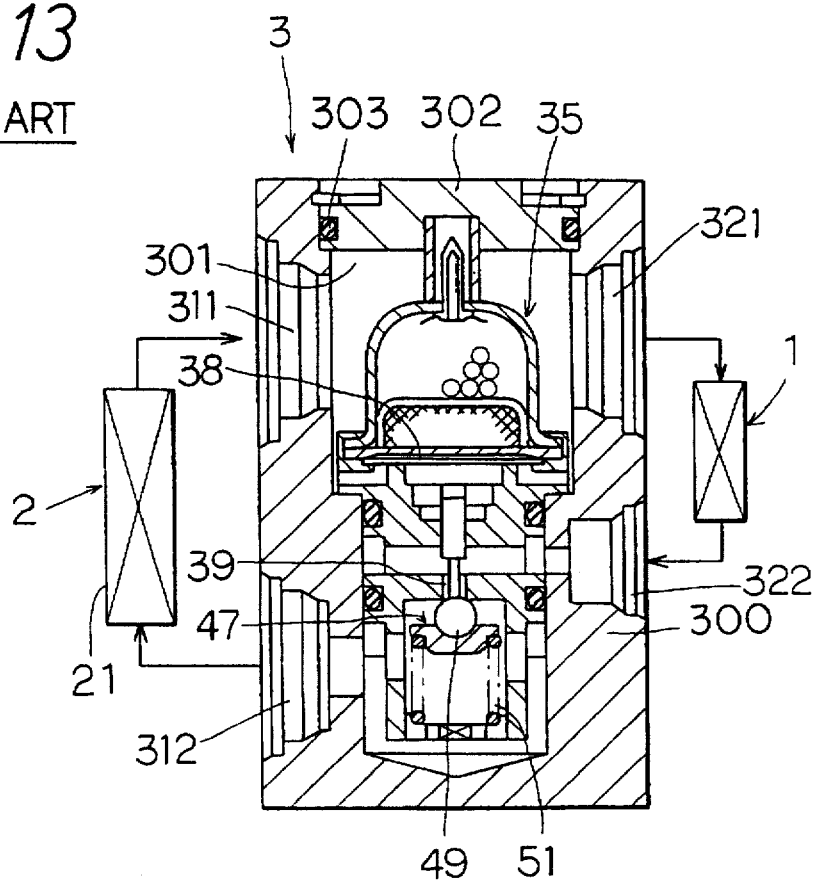
FIG. 13 is a cross sectional view showing the conventional expansion valve.
Figure 14:
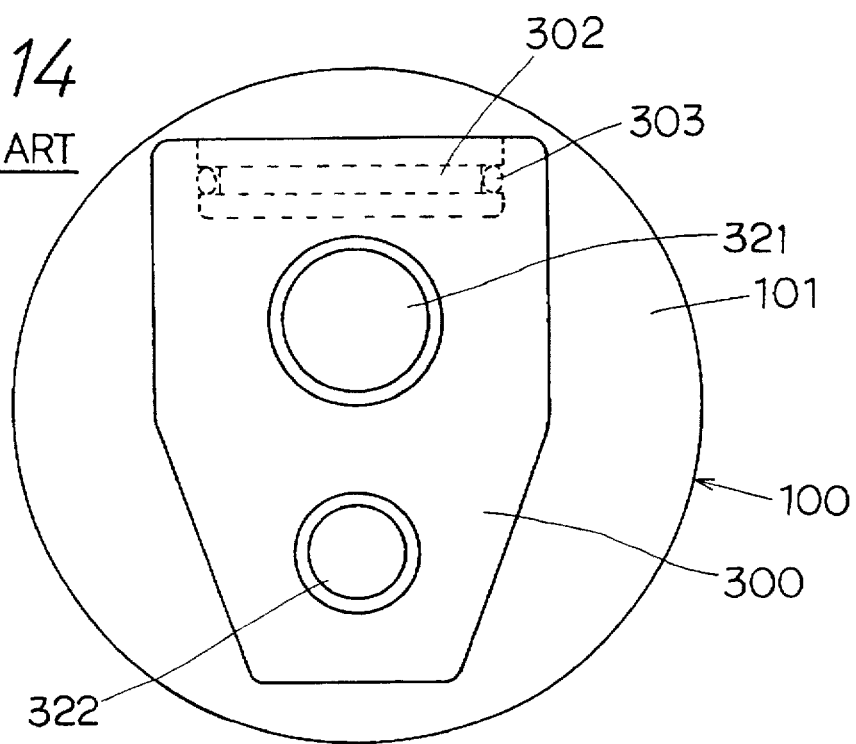
FIG. 14 is a front view of the conventional expansion valve.

In FIG. 11, the arrangement of a temperature sensing mechanism 235 and a spring 251 are changed, and the temperature sensing mechanism 235 itself is movably disposed. A refrigerant pressure (that is, the refrigerant pressure from the outlet side of the evaporator) of the low-pressure side refrigerant passage 34 is introduced through a plurality of through holes 237b (corresponding to the low-pressure introducing hole 41 in the fourth embodiment) opened in a diaphragm case 237 into a lower pressure chamber 243a formed by a lower diaphragm case 237 and the diaphragm 38.

A contacting member 245 which is displaced according to displacement of the diaphragm 38 is disposed in the pressure chamber 243a. The contacting member 245 is made of a metal such as stainless steel, aluminum, or the like and is formed in a disk shape. One face (top face) of the disk shape comes into contact with the diaphragm 38.

A plurality of columnar leg portions 245c are integrally formed from the other face (under face) of the disk-shaped contacting member 245.

The columnar leg portions 245c are slidably fit into the through holes 237b of the lower diaphragm case 237. The end (lower end) of each of the columnar leg portions 245c of the contacting member 245 comes into contact with a metal pressed seating 460 which is joined to the rubber body 254 by baking.

Specifically, the length of the columnar leg portion 245c of the contacting member 245 is set such that the end comes into contact with the seating 460 before the lower diaphragm case 237 comes into contact with the seating 460.

The valve element 49 is made of a metal such as stainless steel and is formed in a sphere shape. One end of a valve rod 248 made of a metal such as stainless steel is integrally joined to the spherical valve element 49 by welding or the like. The other end of the valve rod 248 is integrally connected to the lower diaphragm case 237 by welding, caulking, or the like.

The lower diaphragm case 237 and the valve rod 248 may be also formed as an integral part by cutting, not using the structure of connecting the separate parts.

The seating 460 has a cup-shaped portion 460a extending downwardly from the center portion of the disk plate. The valve rod 248 is slidably fit into the cup-shaped portion 460a. An O-ring (elastic seal member) 460b keeps airtightness in the engagement portion between the valve rod 248 and the cup-shaped portion 460a. A throttle passage 239 is formed on the bottom of the cup-shaped portion 460a of the seating 460 and the refrigerant outflow hole 40 is opened on the side face portion (circumferential wall portion) of the cup-shaped portion 460a.

A metal cover 252a is fixed to the seating 460 by caulking. The metal cover 252a has a plurality of through holes 521 through which the outside and inside are connected to each other. The low-pressure refrigerant of the low-pressure side refrigerant passage 34 flows through the through holes 521 to a portion around the diaphragm cases 236 and 237.

The coil spring 251 is disposed on the upper diaphragm case 236. A spring holder 252c supports the upper end of the coil spring 251. The position of the spring holder 252c is adjusted with respect to the metal cover 252a as a reference face by a screw 252b screwed into the metal cover 252a.

Since the temperature sensing mechanism 235 is movably disposed to be apart from the housings 231 and 232 in the embodiment, the expansion mechanism 247 portion is elastically supported (rubber floated) in the housings 231 and 232 by the rubber body 254.

An operation of the fifth embodiment having such a structure will be described. The gas refrigerant evaporated in the evaporator 21 of the cooling unit 2 flows in the low-pressure side refrigerant passage 34 from the refrigerant inflow hole 311 of the first housing 231 and passes through the passage 34. At that time, the temperature of the refrigerant passing in the passage 34 is transmitted to a temperature sensing chamber 243 through the through holes 521. The pressure in the temperature sensing chamber 243 is set to a pressure corresponding to the temperature of the refrigerant.

The refrigerant pressure of the low-pressure side refrigerant passage 234 is introduced through the through holes 237b into the pressure chamber 243a below the diaphragm 238. When the temperature of the refrigerant in the low-pressure side refrigerant passage 234 is increased and the pressure in the temperature sensing chamber 243 is increased, the diaphragm 38 presses the top face of the contacting member 245 toward the lower part of FIG. 11.

However, since the leg portions 245c of the contacting member 245 already come into contact with the seating 460, the contacting member 245 cannot be moved toward the lower part of FIG. 11. Since the leg portions 245c of the contacting member 245 are slidably fit into the through holes 237a of the diaphragm case 237, "the pressing force from the diaphragm 238 to the contacting member 245" generated by the rise in pressure in the temperature sensing chamber 243 acts as a force for pressing the entire temperature sensing mechanism 235 in the upward direction of FIG. 11 by using the contacting portions of the leg portions 245c of the contacting member 245 and the seating 460 as a fulcrum.

Since the spring force to the bottom of FIG. 11 acts on the temperature mechanism 235 by the coil spring 251, the coil spring 251 is contracted as the temperature sensing mechanism 235 is moved in the upward direction in FIG. 11 and the spring force is increased. The temperature sensing mechanism 235 is moved in the upward direction of FIG. 11 until the spring force and the "pressing force from the diaphragm 38 to the contacting member 245" are balanced.

The valve element 49 is integrally connected via the valve rod 248 to the lower diaphragm case 237 of the temperature sensing mechanism 235, so that the valve rod 248 and the valve rod 49 are moved integrally with the temperature sensing mechanism 235. The valve element 49 increases the opening degree of the throttle passage 239 as the valve element 49 is moved in the upward direction of FIG. 11. The flow of the refrigerant passing through the throttle passage 239 is increased, so that the degree of superheat of the gas refrigerant at the outlet of the evaporator 21 is maintained at a predetermined value.

On the contrary, when the temperature of the refrigerant in the low-pressure side refrigerant passage 34 is decreased and the pressure in the temperature sensing chamber 243 is reduced, the "pressing force from the diaphragm 38 to the contacting member 245" is reduced, and the whole temperature sensing mechanism 235 is pressed by the spring force of the coil spring 251 in the downward direction of FIG. 11, so that the valve element 49 decreases the opening degree of the throttle passage 239.

The target degree of superheating of the gas refrigerant at the outlet of the evaporator 21 can be changed by adjusting the spring force of the coil spring 251.

Since the expansion mechanism 247 portion is elastically supported (rubber floated) in the housings 231 and 232 by the rubber body 254, the noise of the expansion valve can be lowered also in the embodiment.

By using the first and second housing cases 231 and 232, an effect similar to that of the first embodiment can be obtained.

Although the metal cover 252a is fixed to the seating 460 by the caulking, the spring holder 252c is held by the cover 252a, and the upper end of the coil spring 251 is supported by the spring holder 252c in the fifth embodiment, the cover 252a may be supported by the first housing 231 in place of the seating 460.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A thermal expansion valve for expanding refrigerant and for forming therein a refrigerant passage for a refrigerating apparatus including a compressor and an evaporator, said valve comprising:

a first, cylindrical housing member having a bottom at a first end and an opening at a second end thereof;

a second, columnar housing member fit into and integrally coupled to said first housing member from the second end of said first housing member in an axial direction of said first housing member;

a first joint portion at said first end of said first housing member for communicating with said evaporator outlet side, through which refrigerant from said outlet of said evaporator flows into said first housing member;

a temperature sensing mechanism, in said second housing member, having a temperature sensing chamber for sensing a temperature of the refrigerant from said evaporator outlet side;

a second joint portion, on an outer end surface of said second housing member, for communicating with a suction side of said compressor, through which the refrigerant from said evaporator outlet side flows into said compressor suction side;

a third joint portion, on said second housing member outer end surface, through which high-pressure side liquid refrigerant flows into said second housing member;

an expansion mechanism, in said second housing member, for decompressing and expanding the high-pressure side liquid refrigerant in accordance with a temperature of the refrigerant sensed by said temperature sensing mechanism; and a fourth joint portion on said first end side of said first housing member, for communicating with an inlet side of said evaporator, through which the refrigerant expanded by said expansion mechanism flows into said evaporator inlet side.

2. A thermal expansion valve according to claim 1, further comprising a sealing member in an engagement portion between an inner surface of said first housing member and an outer peripheral surface of said second housing member to maintain airtightness.

3. A thermal expansion valve according to claim 1, wherein said temperature sensing mechanism and said expansion mechanism are disposed in said second housing member in a direction which perpendicularly crosses an engagement face of said first and second housing members.

4. A thermal expansion valve according to claim 1, wherein said first housing member is directly coupled to said evaporator.

5. A thermal expansion valve according to claim 1, wherein said first and second joint portions are provided on said bottom of said first housing.

6. A thermal expansion valve according to claim 1, wherein said expansion mechanism includes:

a pressure responsive member moveable in response to a temperature of the refrigerant sensed by said temperature sensing mechanism; and a valve body for controlling an opening degree of a throttle passage, for decompressing and expanding the high-pressure side liquid refrigerant, said valve body being displaced in accordance with a displacement of said pressure responsive member.

7. A thermal expansion valve according to claim 1, wherein said expansion mechanism is elastically supported in said first and second housing members.

8. A thermal expansion valve according to claim 7, wherein said expansion mechanism is supported by a rubber supporting member in second first and said housing members.

9. A thermal expansion valve according to claim 6, further comprising:

a pressure responsive member, within a case of said temperature sensing mechanism, for being displaced responsive to a temperature of the refrigerant sensed by said temperature sensing mechanism; and a valve body of said expansion mechanism, integrally joined to said pressure responsive member, for controlling an opening degree of a throttle passage, for decompressing and expanding the high-pressure side liquid refrigerant, said valve body being displaced in accordance with a displacement of said pressure responsive member;

wherein said temperature sensing mechanism and said valve body are integrally moved in accordance with the displacement of said pressure responsive member.

10. A thermal expansion valve according to claim 9, further comprising a rubber supporting member for supporting said expansion mechanism in said first and said housing members elastically.

11. A thermal expansion valve according to claim 10, wherein said rubber supporting member includes a first supporting portion for said expansion mechanism and a second supporting portion for supporting said temperature sensing mechanism, said first and second supporting portions being integrally formed.

12. A thermal expansion valve according to claim 10, wherein said rubber supporting member includes therein a high-pressure side refrigerant passage through which the high-pressure refrigerant flows and a low-pressure side refrigerant passage through which low-pressure refrigerant having passed through said throttle passage flows.

13. A thermal expansion valve according to claim 10, wherein a rubber hardness of said rubber supporting member is in a range of Hs 50–70.

14. An air conditioning apparatus for a vehicle having an engine compartment and a passenger compartment partitioned by a dashboard, said apparatus comprising:

condensing equipment, in said engine compartment, including a compressor for condensing refrigerant, a compressor suction side refrigerant pipe for a suction side of said compressor and a high pressure side liquid refrigerant pipe for high pressure side liquid refrigerant;

a cooling unit, disposed in said passenger compartment, including an evaporator having an inlet side refrigerant pipe and an outlet side refrigerant pipe; and a thermal expansion valve for expanding refrigerant and for connecting between said condensing equipment and said cooling unit, said thermal expansion valve including:

a first, cylindrical housing member having a bottom at a first end and an opening at a second end thereof;

a second, columnar housing member fit into and integrally coupled to said first housing member from the second end of said first housing member in an axial direction of said first housing member, a first joint portion, at said first end of said first housing member, for communicating with said evaporator outlet side pipe, through which refrigerant from said evaporator outlet side pipe flows into said first housing member, a temperature sensing mechanism, in said second housing member, having a temperature sensing chamber for sensing a temperature of the refrigerant from said evaporator outlet side pipe, a second joint portion, on an outer end surface of said second housing member, for communicating with said compressor suction side, through which the refrigerant from said outlet of said evaporator outlet side pipe flows into said compressor suction side, a third joint portion, on an outer end surface of said second housing member, through which high-pressure side liquid refrigerant flows into said second housing member, an expansion mechanism, in said second housing member, for decompressing and expanding the high-pressure side liquid refrigerant responsive to a temperature of the refrigerant sensed by said temperature sensing mechanism, and a fourth joint portion, on said one end of said first housing member, for communicating with said evaporator inlet side, through which the refrigerant expanded by said expansion mechanism flows into said inlet side pipe of said evaporator;

wherein said dashboard includes a through hole into which said thermal expansion valve is fit with an elastic member;

said outlet side refrigerant pipe of said evaporator is coupled to said first joint portion of said thermal expansion valve;

said compressor suction side refrigerant pipe of said condensing equipment is coupled to said second joint portion of said thermal expansion valve;

said high-pressure side liquid refrigerant pipe of said condensing equipment is coupled to said third joint portion of said thermal expansion valve; and said inlet side refrigerant pipe of said evaporator is coupled to said fourth joint portion of said thermal expansion valve.

15. A thermal expansion valve according to claim 1, wherein said temperature sensing mechanism and said expansion mechanism are in said second housing member.

16. A thermal expansion valve according to claim 15, wherein said expansion mechanism includes:

a pressure responding member for being displaced responsive to a temperature of the refrigerant sensed by said temperature sensing mechanism; and a valve body for controlling an opening degree of a throttle passage formed in said second housing member, for decompressing and expanding the high-pressure side liquid refrigerant, said valve body being displaced responsive to a displacement of said pressure responding member.

17. A thermal expansion valve according to claim 16, further comprising:

a pressure responding member, in a case of said temperature sensing mechanism, for being displaced in accordance with a temperature of the refrigerant sensed by said temperature sensing mechanism;

a valve body of said expansion mechanism, joined to said pressure responding member of said temperature sensing mechanism, for controlling an opening degree of a throttle passage formed in said second housing member, for decompressing and expanding the high-pressure side liquid refrigerant, said valve body being displaced in accordance with a displacement of said pressure responding member;

wherein said temperature sensing mechanism and said valve body are integrally moved in accordance with the displacement of said pressure responding member.

18. An air conditioning apparatus according to claim 14, wherein said temperature sensing mechanism and said expansion mechanism are provided in said second housing member.

19. A method of assembling a thermal expansion valve, said method comprising:

disposing an expansion mechanism in a first communication path of a columnar housing between a joint portion for connection to a high-pressure refrigerant line and a joint portion for connection to an evaporator inlet so that said expansion mechanism controls the flow of a medium therethrough;

disposing a temperature sensing mechanism in a second communication path of said columnar housing between a joint portion for connection to an evaporator inlet and a joint portion for connection to a compressor suction side so that said temperature sensing mechanism moves said expansion mechanism responsive to the temperature of a medium in said second communication path; and fitting said columnar housing into a hollow cylindrical housing in an axial direction of said hollow cylindrical housing to establish an airtight seal therebetween.

* * * * *

UNITED STATES PATENT AND TRADEMARK OFFICE
CERTIFICATE OF CORRECTION

PATENT NO. : 5,732,570
DATED : March 31, 1998
INVENTOR(S) : Yoshitaka Tomatsu et al It is certified that error appears in the above-identified patent and that said Letters Patent is hereby corrected as shown below:

Title page, [57] Abstract, line 3, delete "values" and substitute --valves-- therefor Col. 2, line 1, after "aspect" insert --of--

Col. 2, line 13, delete "the"

Col. 4, line 7, "side;" should be --side--

Col. 5, line 31, "sensitive" should be --sensing--

Col. 6, line 45, delete "R" and substitute --E-- therefor

Col. 6, line 47, delete "dashborad" and substitute --dashboard-- therefor

Col. 7, line 29, after "with" insert --each--

Col. 10, line 64, delete "noises" and substitute --noise-- therefor

Col. 14, line 64, claim 8, "second first and said" should be --said first and second--

Signed and Sealed this

Twenty-third Day of February, 1999

Attest:

Q. TODD DICKINSON

Attesting Officer

Acting Commissioner of Patents and Trademarks